United States Patent [19]
Nisbet

[11] 3,938,406
[45] Feb. 17, 1976

[54] FORCE LIMITING DEVICE FOR A MOTOR VEHICLE PARKING BRAKE

[75] Inventor: Kenneth J. Nisbet, Ann Arbor, Mich.

[73] Assignee: Ford Motor Company, Dearborn, Mich.

[22] Filed: Aug. 28, 1974

[21] Appl. No.: 501,420

[52] U.S. Cl. ................................. 74/512; 74/519
[51] Int. Cl.² ..................... G05G 1/14; G05G 1/04
[58] Field of Search ........... 74/501 R, 512, 516, 519

[56] References Cited
UNITED STATES PATENTS
| | | | |
|---|---|---|---|
| 1,645,846 | 10/1927 | Andres | 74/512 |
| 3,466,942 | 9/1969 | Keller et al. | 74/516 |

*Primary Examiner*—Kenneth W. Sprague
*Attorney, Agent, or Firm*—Clifford L. Sadler; Keith L. Zerschling

[57] ABSTRACT

A force limiting device for a motor vehicle parking brake according to the present invention includes an intermediate lever that is connected by a first cable to a brake pedal and by a second cable to a wheel brake. The intermediate lever is supported on a support lever and the support lever, in turn, is supported on vehicle body structure. The support lever is displaceable from its normal stationary support position to a force limiting position. Tension forces in the first and second cables acting through the intermediate lever will cause the support lever to move from its normal support position to its force limiting position when said tensions exceed a predetermined minimum. With this construction, excessive displacement of the brake pedal will cause the support lever to be displaced rather than produce excessive loads upon the wheel brake.

3 Claims, 4 Drawing Figures

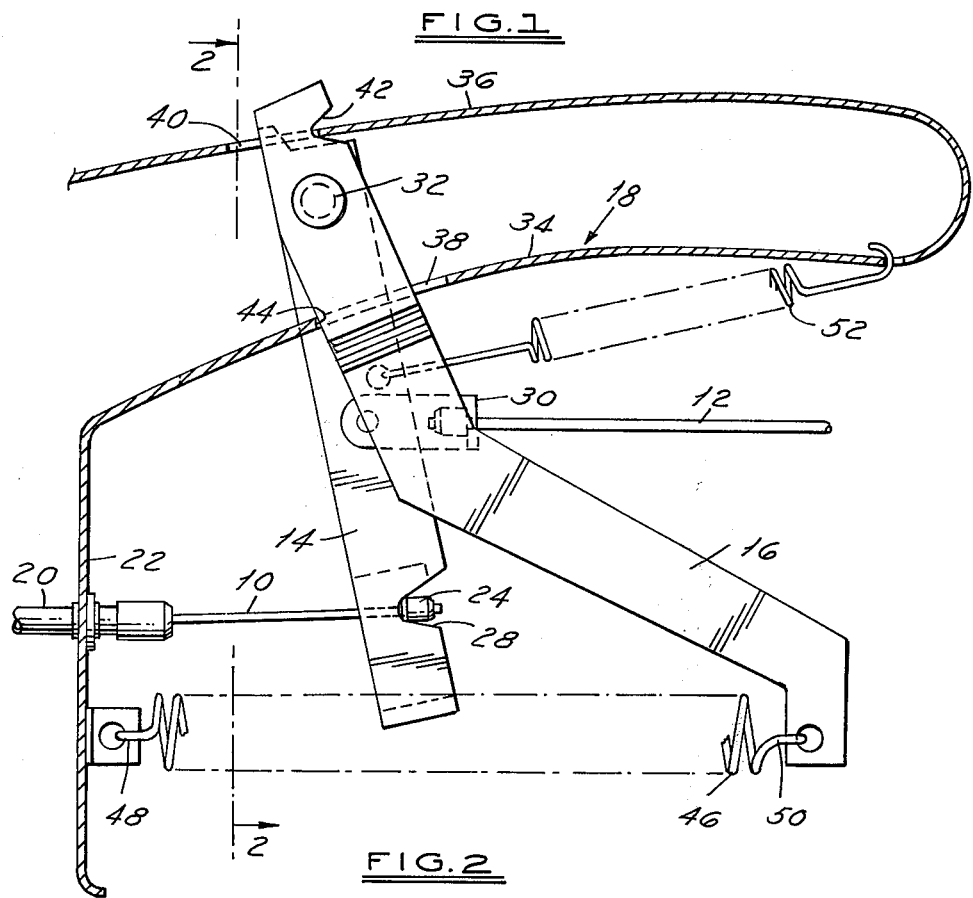
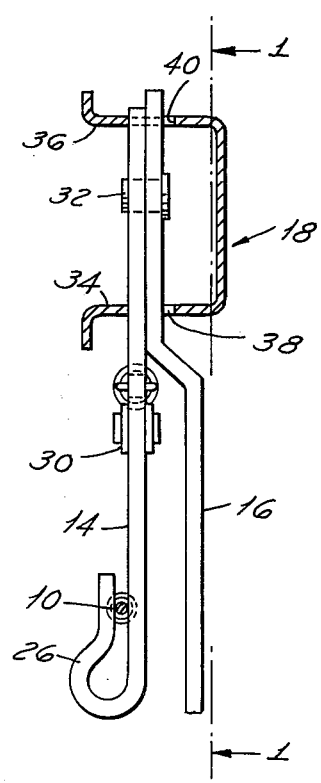

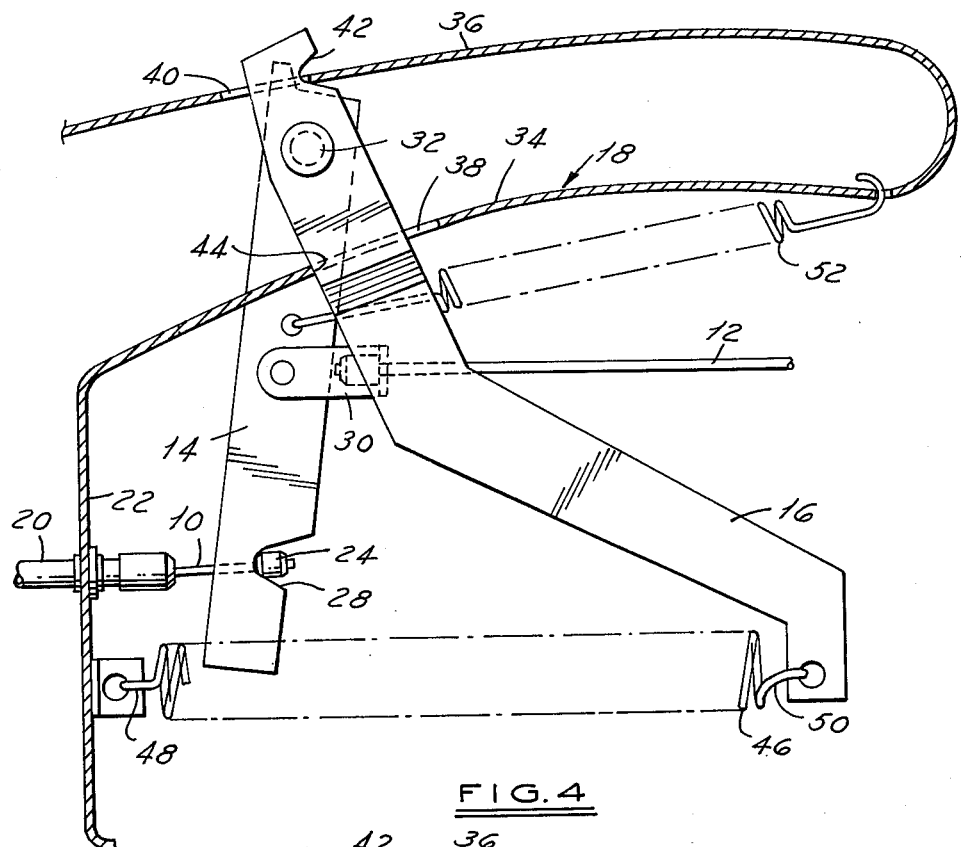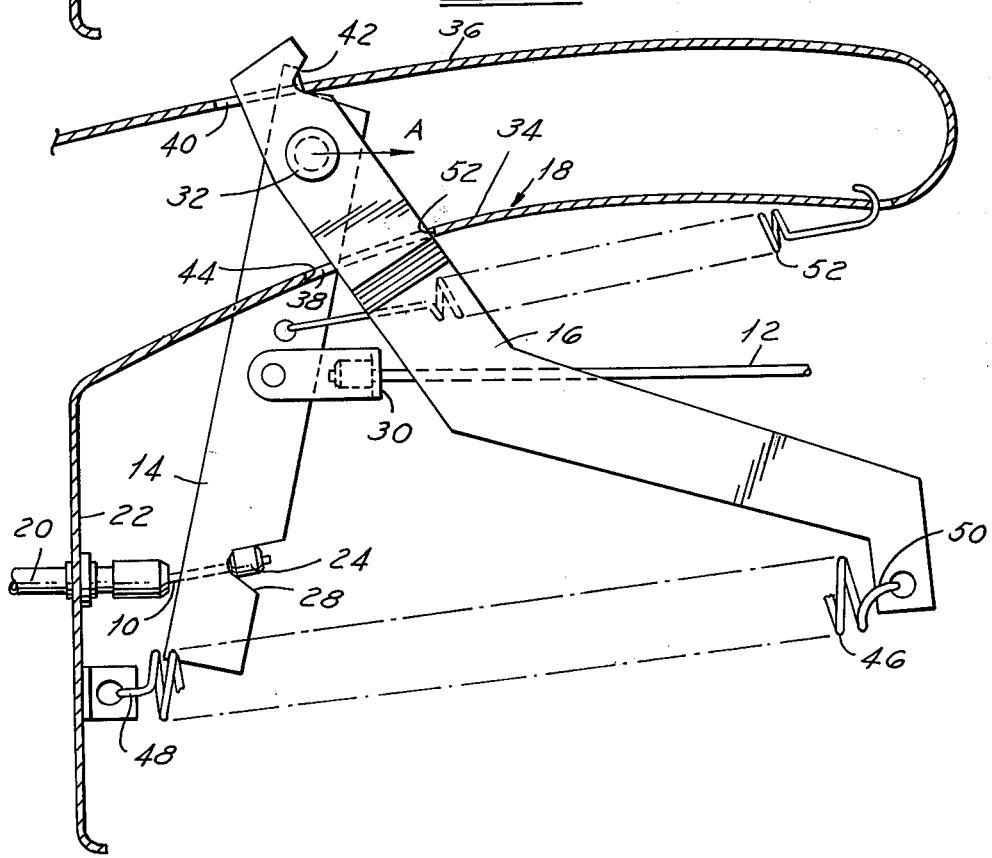

FORCE LIMITING DEVICE FOR A MOTOR VEHICLE PARKING BRAKE

BACKGROUND AND SUMMARY OF THE DISCLOSURE

In parking brake systems for motor vehicles having foot operated parking brake controls, it is possible to impose a load upon the components in the wheel brake that exceeds a desirable limit. According to the present invention, a means is provided for limiting the forces exerted upon a cable actuated wheel brake.

A brake system in accordance with this invention includes a parking brake control pedal to which an actuating cable is connected. A wheel brake has a brake cable connected thereto. The two cables are connected to an intermediate lever. The intermediate lever in turn is supported on a support lever or movable fulcrum member. The support lever is displaceable between a normally stationary support position and a force limiting position. A coil spring urges the support lever to its normal position.

The application of a force on the parking brake pedal by the vehicle operator will cause the actuating cable to displace the intermediate lever from a brake released position to a brake applied position. Displacement of the intermediate lever, in turn, will cause the cable running to the wheel brake to be tensioned and the brake to be applied. When the tensions in the two cables reach predetermined maximums, the force imposed upon the support lever by the intermediate lever will cause the support lever to overcome the force of its retaining spring and to pivot from its support position to its force limiting position. Thus, with this double lever construction, tensioning of the actuating cable by the parking brake pedal by an amount that exceeds a predetermined maximum will cause displacement of the support lever rather than additional loading of the wheel brake cable. Such action will prevent an excessive build up of forces in the wheel brake.

BRIEF DESCRIPTION OF THE DRAWINGS

The many objects and advantages of a motor vehicle brake system constructed in accordance with this invention will become apparent upon consideration of the following detailed discussion and the accompanying drawings, in which:

FIG. 1 is a bottom plan view partly in section taken along section line 1—1 of FIG. 2 of a portion of a cable actuated parking brake system showing an actuating cable, a brake cable and a force limiting linkage mechanism. The linkage is shown in a brake released condition.

FIG. 2 is a sectional view taken along section line 2—2 of FIG. 1.

FIG. 3 is a bottom plan view corresponding to FIG. 1 showing the linkage components in their brake applied position.

FIG. 4 is a bottom plan view corresponding to FIGS. 1 and 3 showing the linkage in a force limiting position.

DETAILED DESCRIPTION OF PRESENTLY PREFERRED EMBODIMENT

Referring now to the drawings, wherein the presently preferred form of the invention is illustrated, FIG. 1 discloses first and second brake cables 10 and 12 of a cable actuated parking brake system for a motor vehicle. Cable 10 is an actuating cable connected to a parking brake control pedal. Cable 12 is a brake cable connected to a wheel brake.

Cables 10 and 12 are connected to an intermediate lever 14 which in turn is pivotly connected to a support lever or movable fulcrum member 16. The support lever is supported on sheet metal body structure 18 of a motor vehicle.

Actuating cable 10 slides within a tubular conduit 20 which is anchored to a flange portion 22 of the body structure 18. A stop member 24 is swaged to the end of the cable 10. Referring to FIG. 2, the intermediate lever 14 is formed from a band of sheet metal having a doubled over end 26. Aligned notches 28 are provided in the doubled over end 26 and in the adjacent portion of the main body portion of the lever 14. The stop member 24 on the end of the cable 10 is seated in the pair of aligned notches 28.

The brake cable 12 is connected to a mid-point of the intermediate lever 14 by means of a clevis 30.

The intermediate lever 14 is pivotally connected to the support lever 16 by a pivot pin 32. The support lever 16 is supported on the sheet metal body structure 18 of the vehicle. As seen in FIG. 2, the structure 18 has a generally channel shape formed in part by walls 34 and 36. Openings 38 and 40 are provided in the walls 34 and 26. The support lever 16 has a notch 42 formed at its end adjacent to pivot pin 32. The notch 42 engages the edge of the opening 40 which functions as a fulcrum for the support lever 16.

The edge of the opening 38 in wall 34 is provided with a step which forms an abuttment 44 that is normally engaged by a lever 16. A coil spring 46 has one end 48 anchored to the flange portion 22 of the support structure 18 and its other end 50 hooked to the outer end of the support lever 16. The coil spring 46 urges the notched end 42 of the support lever 16 into engagement with the edge of the opening 40 and another portion of the lever 16 into engagement with the abuttment 44.

A coil spring 52 has one end hooked to the structure 18 and its other end coupled to a mid-point on intermediate lever 14. The spring 52 urges the lever 14 in a counter-clock wise direction (as seen in FIG. 1) to a brake released position. In response to the force of the spring 52, the actuating cable 10 is placed under a low tensile load and the cable 14 is free to move to a brake released position in response to the retractor springs in the wheel brake.

OPERATION

FIG. 1 of the drawing discloses the linkage mechanism connecting the actuating cable 10 and the brake cable 12 in a brake released condition. The intermediate lever 14 is in its brake released position in response to the force of the spring 52. The support lever 16 is in its normal support position in response to the force of the coil spring 46.

When the brake actuating cable 10 is placed under tension in response to the application of a force to the parking brake control pedal by the motor vehicle operator, the intermediate lever 14 will move from the FIG. 1 brake released position to the FIG. 3 brake applied position. In moving from the released position to the applied position, the wheel brake cable 12 is displaced and placed under tension. The intermediate lever 14 is a lever of the second class and provides a mexhanical advantage whereby the tension imposed upon the brake cable 12 is a multiple of the tension in the actuating cable 10.

The abutment 44 is formed as a step in the edge of the opening 38 and does not interfere with the movement of the intermediate lever 14 from the released to the applied position.

When the tension in the cables 10 and 12 exceed a predetermined maximum amount, the reaction force (see arrow A in FIG. 4) imposed on the support lever 16 by the pivot pin 32 will cause the support lever 16 to move away from its normal support position where it engages the abutment 44. The lever 16 will be displaced in a counterclockwise direction until it engages an abutment 54 formed by the edge of the opening 38.

In FIG. 3, the intermediate lever 14 is in its brake applied position. Any increase in tension in the actuating cable 10 by an amount that exceeds the tension necessary to fully apply the wheel brake will result in displacement of the support lever 16 from its normal support position (as in FIGS. 1 and 3) to a force limiting position (as in FIG. 4). The reaction force A on the support lever 16 acting through the lever arm distance between the center of the pivot pin 32 and the notch 42 will exceed the force of the spring 46 acting through the length of the support lever 16. Therefore, tensioning of the actuating cable 10 by an excessive amount will cause the support lever 16 to be displaced rather than causing additional tensioning of the wheel brake cable 12.

In summary, the present invention provides a linkage mechanism that includes an intermediate lever for connecting a brake actuating cable and a wheel brake cable that has the capability of increasing the tension in the brake cable relative to the tension in the actuating cable during normal operation. The linkage mechanism also has the capability of preventing excess tensioning of the wheel brake cable by displacing a spring biased support for the intermediate lever.

The foregoing description presents the presently preferred embodiment of this invention. Details of construction are disclosed for purposes of illustration and are not to be considered limits of the invention. Modifications and alterations of the invention may occur to those skilled in the art that will come within the scope and spirit of the following claims.

I claim:

1. A force limiting device for a cable actuated mechanism comprising a cable constructed to be connected to said mechanism,
   an actuator member connected to said cable and displaceable between a cable tension released position and a cable tension applied position,
   a movable fulcrum member and said actuator member being pivotally supported on said fulcrum member,
   a support structure and said fulcrum member being mounted on said support structure and displaceable relative to said structure between a normal support position and a force limiting position,
   spring means urging said fulcrum member to said normal support position,
   said actuator member being constructed to transmit a tension force from said cable to said fulcrum member that urges said fulcrum member from said normal support position to said forced limiting position,
   said fulcrum member being displaceable from said normal support position to said force limiting position in response to a level of tension in said cable that exceeds a predetermined amount.

2. A motor vehicle brake system having a cable constructed to be connected to a wheel brake,
   a lever connected to said cable,
   a movable fulcrum member and said lever being pivotally connected to said fulcrum member and angularly displaceable between a brake applied position and a brake released position,
   vehicle support structure and said fulcrum member being mounted on said vehicle support structure and displaceable relative to said structure between a normal support position and a force limiting position,
   spring means urging said support member to said normal support position,
   said lever being constructed to transmit a tension force in said cable to said fulcrum member that urges said support member from said normal support position to said forced limiting position,
   said fulcrum member being displaceable from said normal support position to said force limiting position in response to a level of tension in said cable that exceeds a predetermined amount.

3. A motor vehicle brake system having a first cable constructed to be connected to a manually operated brake actuator,
   a second cable constructed to be connected to a wheel brake,
   an intermediate lever connected to said first cable and to said second cable,
   a movable fulcrum member and said intermediate lever being pivotally connected to said fulcrum member and angularly displaceable between a brake applied position and a brake released position,
   vehicle support structure and said fulcrum member being mounted on said vehicle support structure and angularly displaceable relative to said structure between a normal support position and a force limiting position,
   first spring means urging said fulcrum member to said normal support position,
   second spring means urging said intermediate lever to said brake released position,
   said intermediate lever being constructed to transmit tension forces from said cables to said fulcrum member that urge said fulcrum member from said normal support position to said forced limiting position,
   said fulcrum member being displaceable from said normal support position to said force limiting position in response to a level of tension in said first and said second cables that exceeds a predetermined amount.

* * * * *